United States Patent
Abe

[19]

[11] Patent Number: 6,124,985
[45] Date of Patent: Sep. 26, 2000

[54] ZOOM MAGNIFIER

[75] Inventor: Tetsuya Abe, Hokkaido, Japan

[73] Assignee: Asahi Kogaku Kogyo Kabushiki Kaisha, Tokyo, Japan

[21] Appl. No.: 09/181,330

[22] Filed: Oct. 28, 1998

[30] Foreign Application Priority Data

Oct. 31, 1997 [JP] Japan ................................. 9-300803

[51] Int. Cl.⁷ ................................................ G02B 15/14
[52] U.S. Cl. ........................... 359/690; 359/684; 359/689
[58] Field of Search .................................. 359/690, 689, 359/687, 684

[56] References Cited

U.S. PATENT DOCUMENTS

| | | | |
|---|---|---|---|
| 4,865,434 | 9/1989 | Matsushita | 350/430 |
| 5,052,787 | 10/1991 | Sugawara | 359/683 |
| 5,627,682 | 5/1997 | Nagaoka | 359/688 |
| 5,828,499 | 10/1998 | Ohtake | 359/676 |
| 5,835,282 | 11/1998 | Suenaga et al. | 359/692 |
| 5,905,596 | 5/1999 | Watanabe | 359/633 |

FOREIGN PATENT DOCUMENTS 5134193  5/1993  Japan .

*Primary Examiner*—Scott J. Sugarman
*Assistant Examiner*—Timothy Thompson
*Attorney, Agent, or Firm*—Greenblum & Bernstein, P.L.C.

[57] ABSTRACT

A zoom magnifier is composed of a positive first lens group, a negative second lens group, a positive third lens group, in this order from the eye side, wherein zooming is performed by moving the second lens group in the optical axis direction, and wherein the zoom magnifier satisfies the following condition:

$$30 \text{ mm} < f_I \quad (1)$$

wherein $f_I$ designates the focal length of the first lens group.

2 Claims, 12 Drawing Sheets

Fig. 1
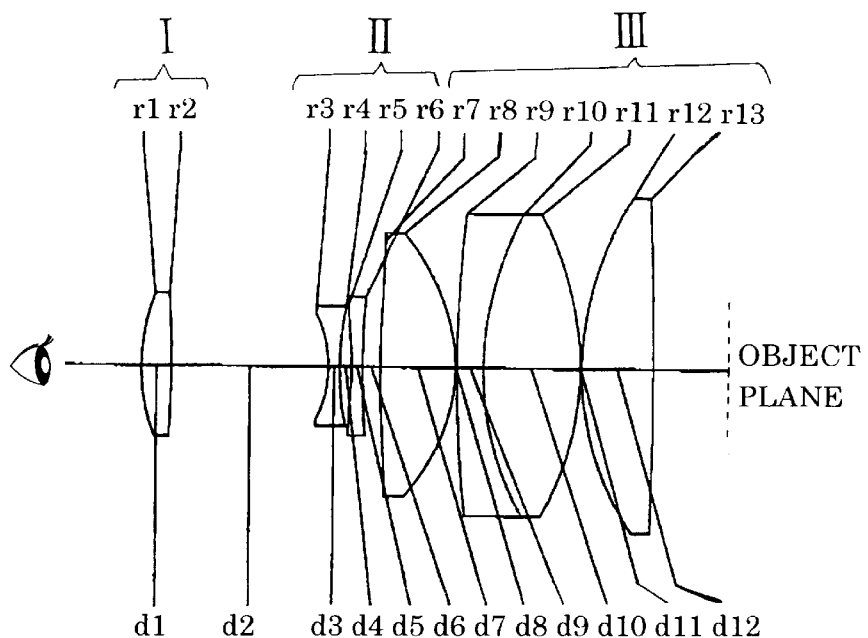
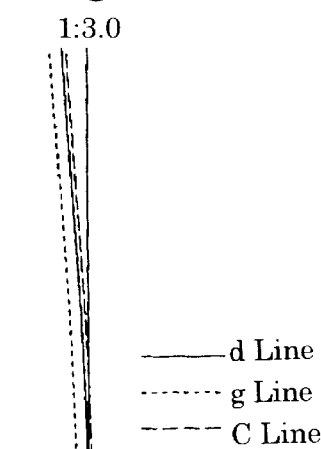
Fig. 2A
1:3.0
———— d Line
········· g Line
– – – – C Line
-0.2  0.2
SPHERICAL
ABERRATION
CHROMATIC
ABERRATION
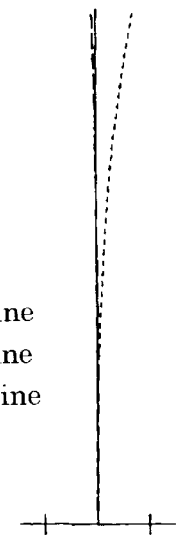
Fig. 2B
W=15.4°
-0.2  0.2
LATERAL
CHROMATIC
ABERRATION
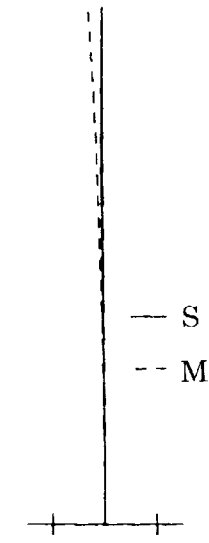
Fig. 2C
W=15.4°
—— S
– – M
-5.0  5.0
ASTIGMATISM
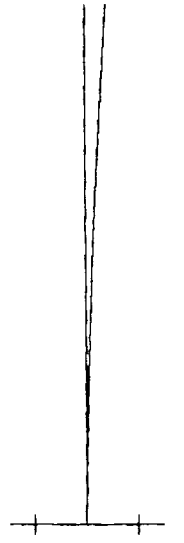
Fig. 2D
W=15.4°
-5.0 (%) 5.0
DISTORTION

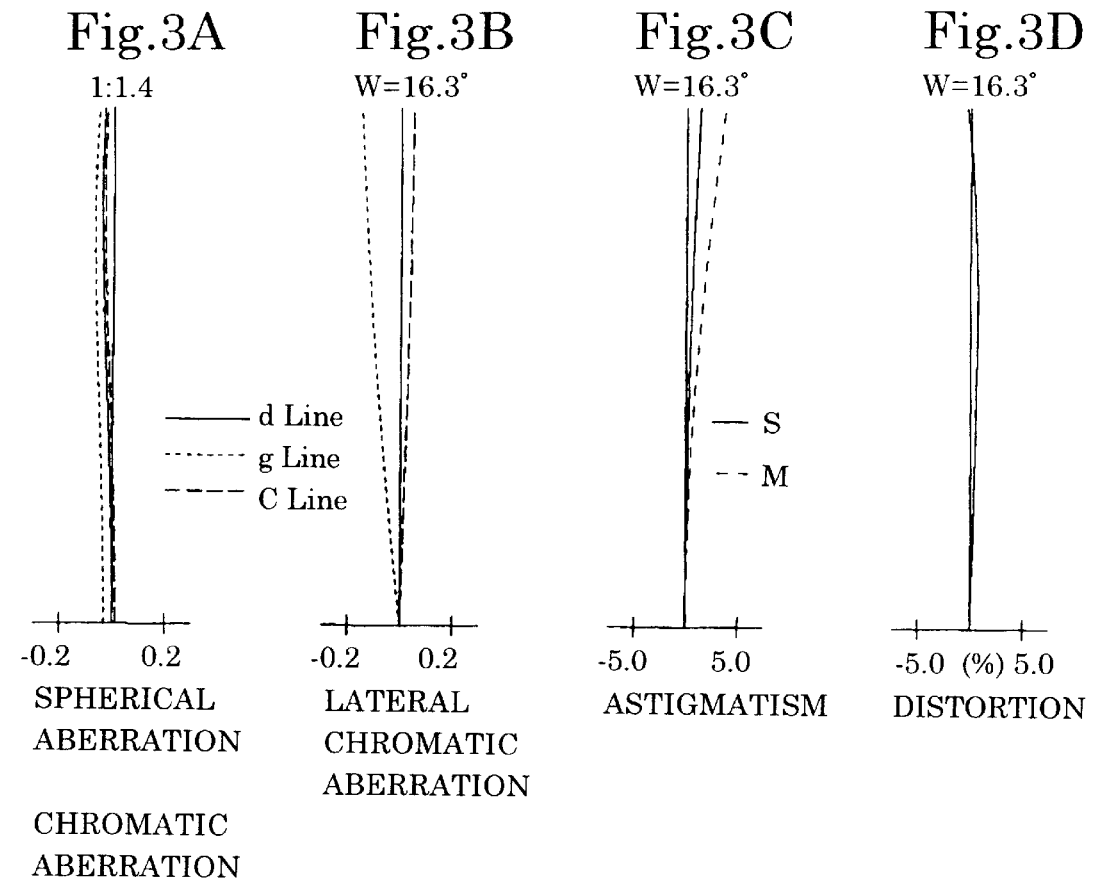
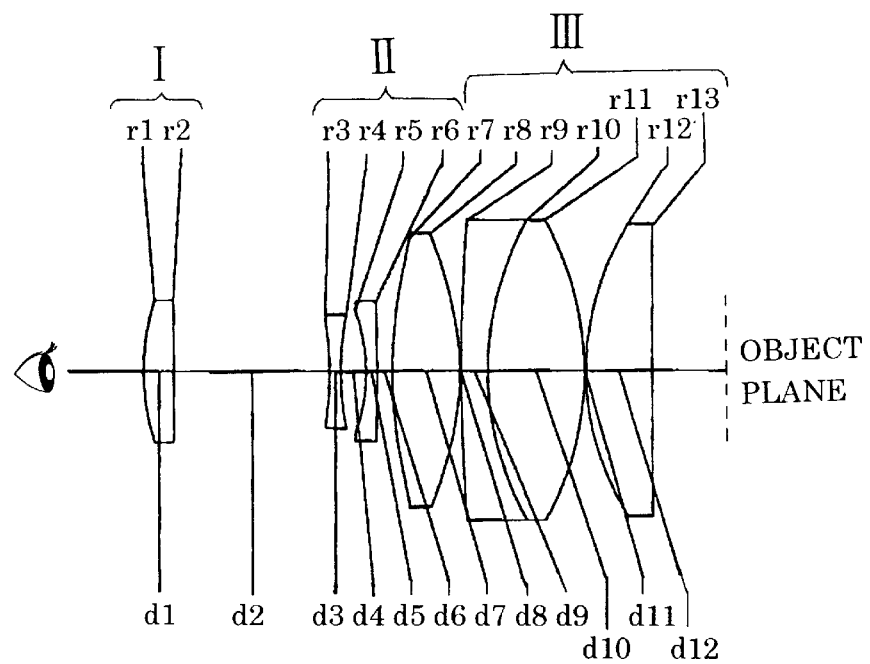

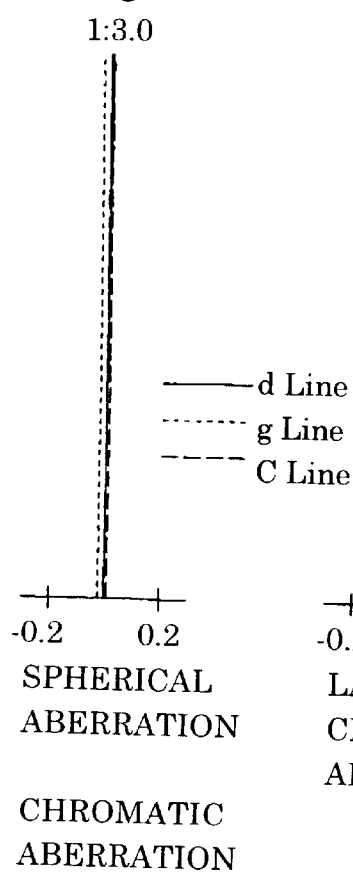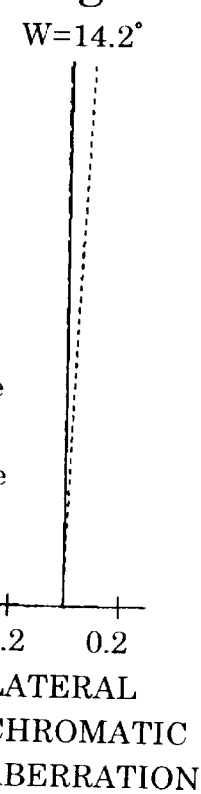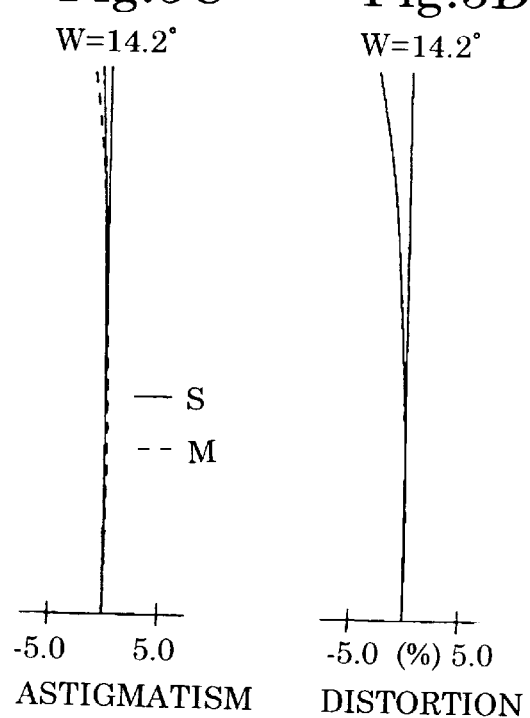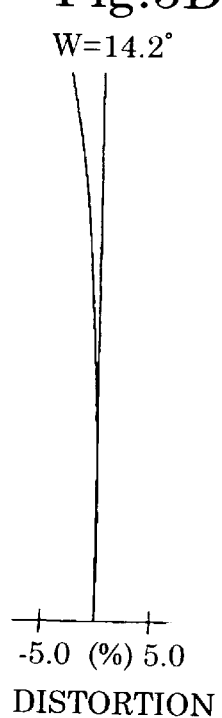
Fig.5A 1:3.0 — SPHERICAL ABERRATION CHROMATIC ABERRATION
Fig.5B W=14.2° — LATERAL CHROMATIC ABERRATION
Fig.5C W=14.2° — ASTIGMATISM
Fig.5D W=14.2° — DISTORTION
— d Line
······ g Line
--- C Line
— S
-- M

1:1.5

―――― d Line
........ g Line
― ― ― C Line

-0.2    0.2
SPHERICAL
ABERRATION

CHROMATIC
ABERRATION

W=16.3°

-0.2    0.2
LATERAL
CHROMATIC
ABERRATION

W=16.3°

― S
- - M

-5.0    5.0
ASTIGMATISM

W=16.3°

-5.0  (%) 5.0
DISTORTION

SPHERICAL ABERRATION

CHROMATIC ABERRATION

LATERAL CHROMATIC ABERRATION

ASTIGMATISM

DISTORTION

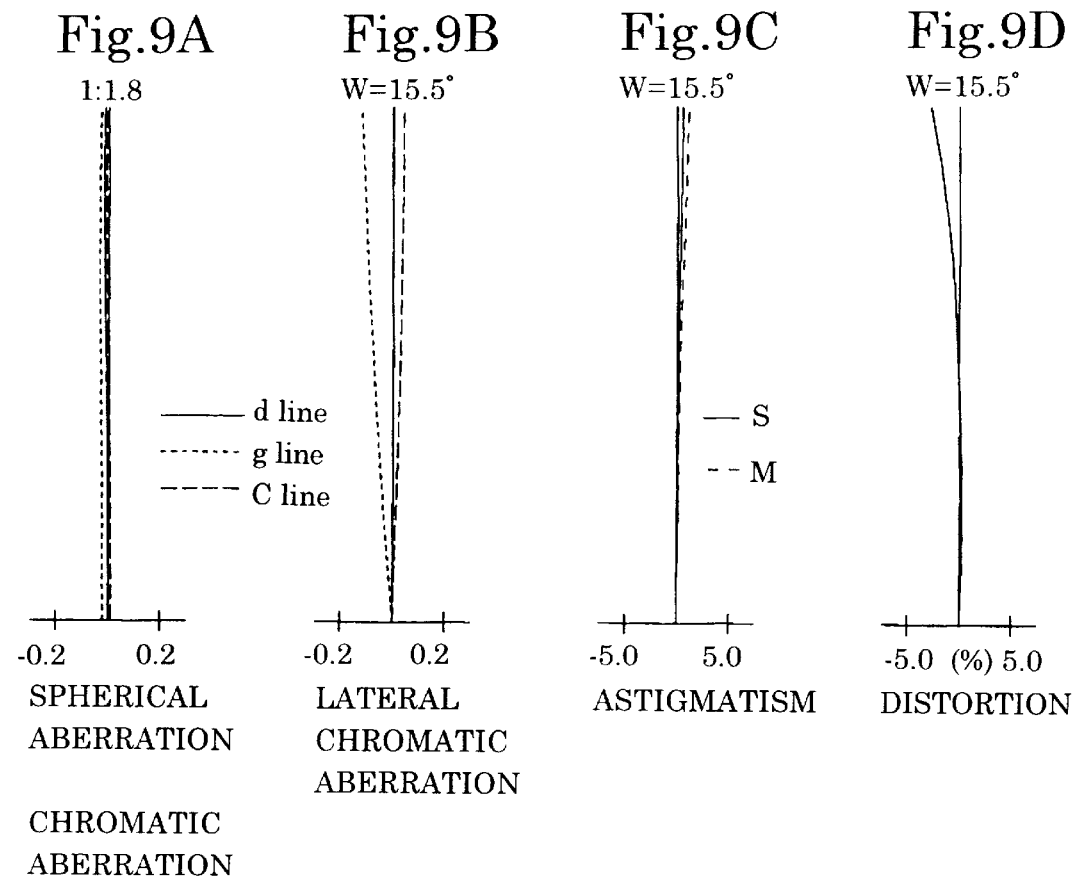
Fig.9A  1:1.8  SPHERICAL ABERRATION  CHROMATIC ABERRATION
Fig.9B  W=15.5°  LATERAL CHROMATIC ABERRATION
Fig.9C  W=15.5°  ASTIGMATISM
Fig.9D  W=15.5°  DISTORTION
— d line
······ g line
---- C line
— S
-- M
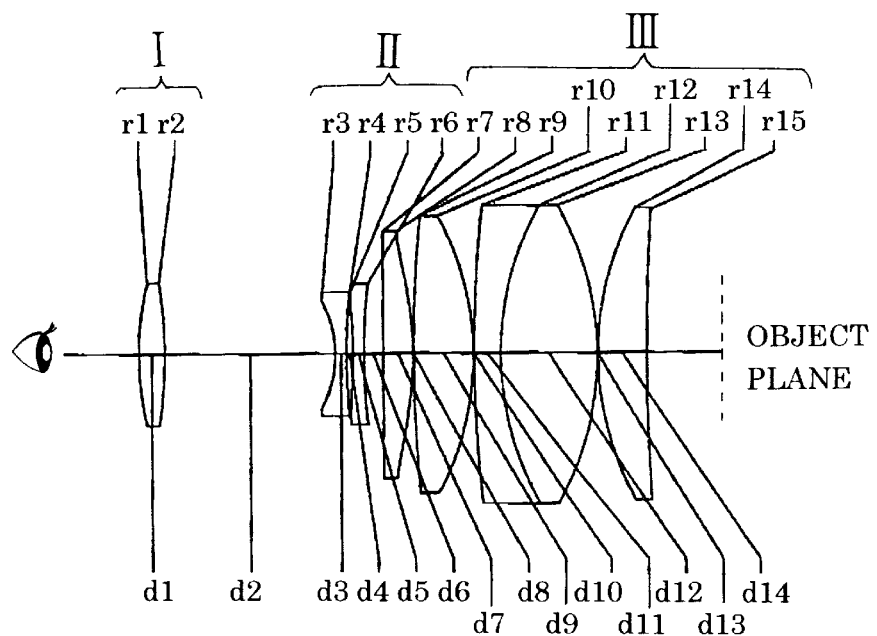
Fig.10

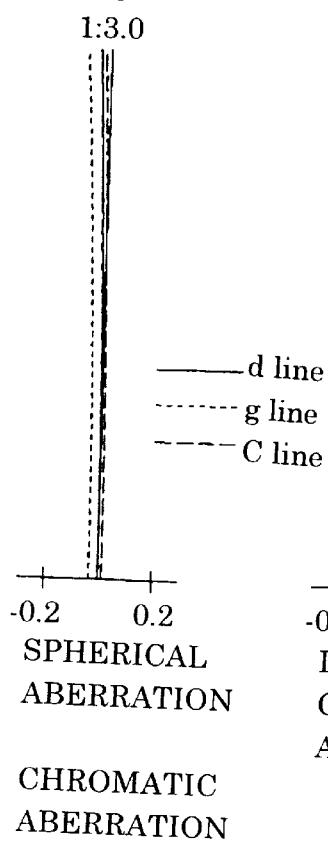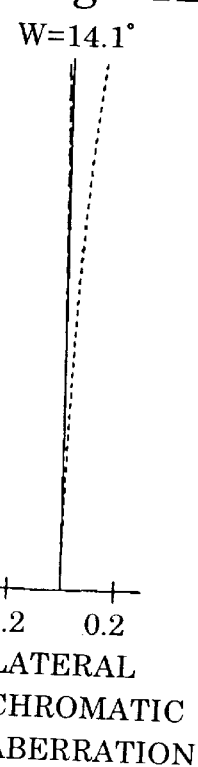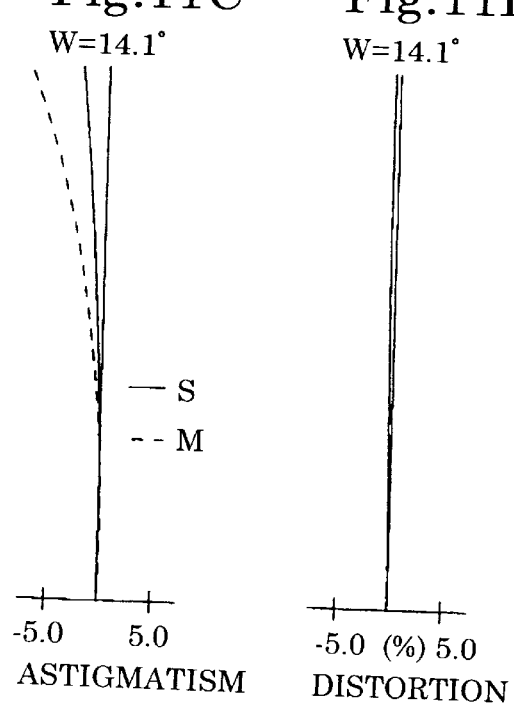
Fig.11A 1:3.0
-0.2  0.2
SPHERICAL ABERRATION
CHROMATIC ABERRATION
—— d line
······ g line
---- C line
Fig.11B W=14.1°
-0.2  0.2
LATERAL CHROMATIC ABERRATION
Fig.11C W=14.1°
-5.0  5.0
ASTIGMATISM
—— S
-- M
Fig.11D W=14.1°
-5.0 (%) 5.0
DISTORTION

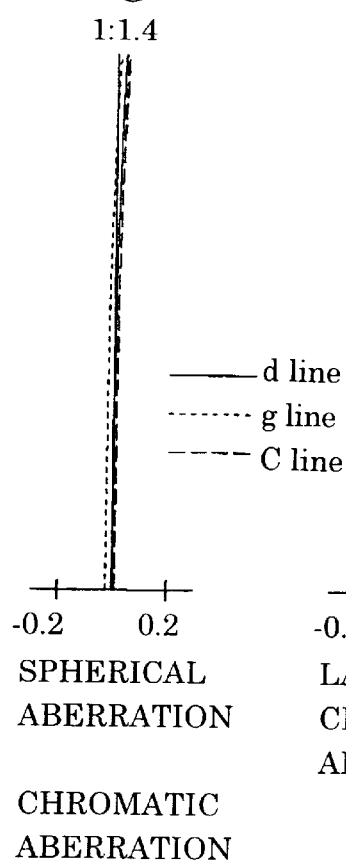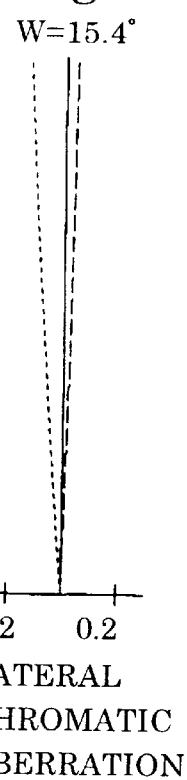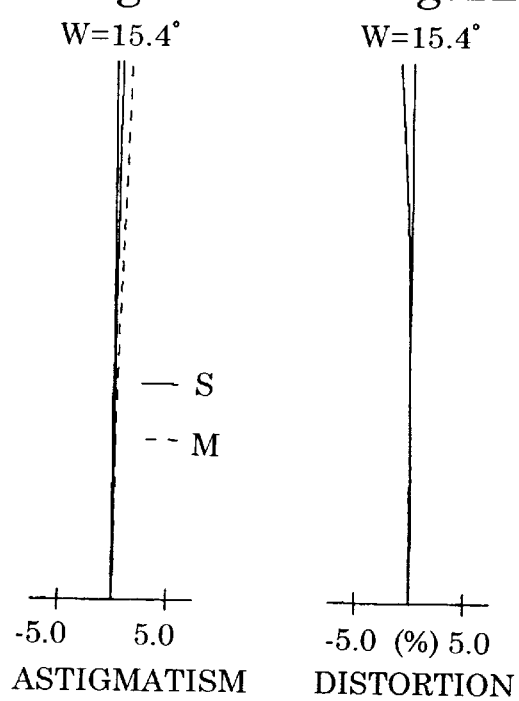
Fig.12A  1:1.4
SPHERICAL ABERRATION
CHROMATIC ABERRATION
Fig.12B  W=15.4°
LATERAL CHROMATIC ABERRATION
Fig.12C  W=15.4°
ASTIGMATISM
Fig.12D  W=15.4°
DISTORTION Fig.13
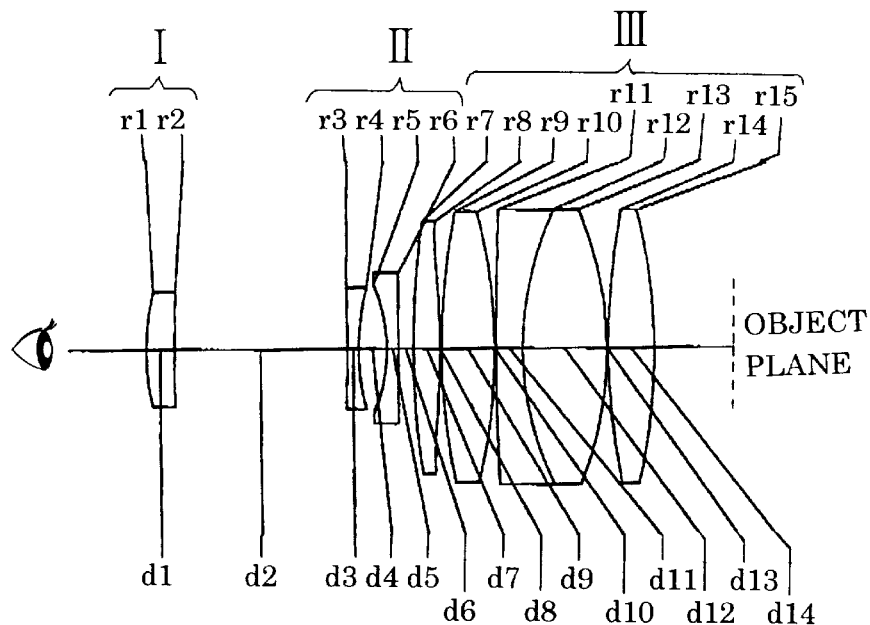
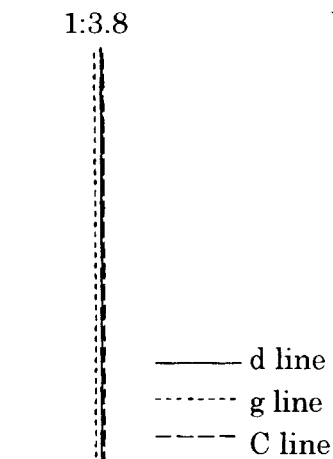
Fig.14A
1:3.8
——— d line
······· g line
- - - C line
-0.2   0.2
SPHERICAL
ABERRATION
CHROMATIC
ABERRATION
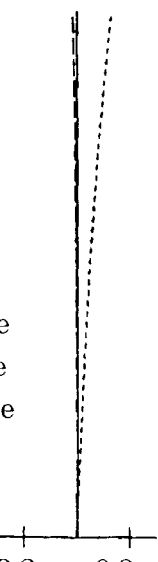
Fig.14B
W=14.0°
-0.2   0.2
LATERAL
CHROMATIC
ABERRATION
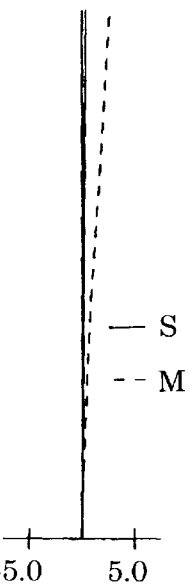
Fig.14C
W=14.0°
— S
- - M
-5.0   5.0
ASTIGMATISM
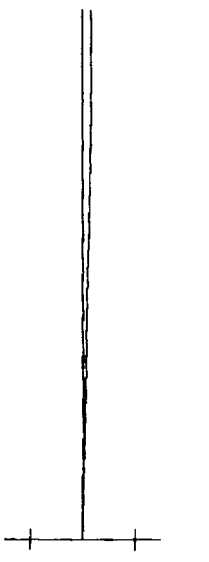
Fig.14D
W=14.0°
-5.0 (%) 5.0
DISTORTION

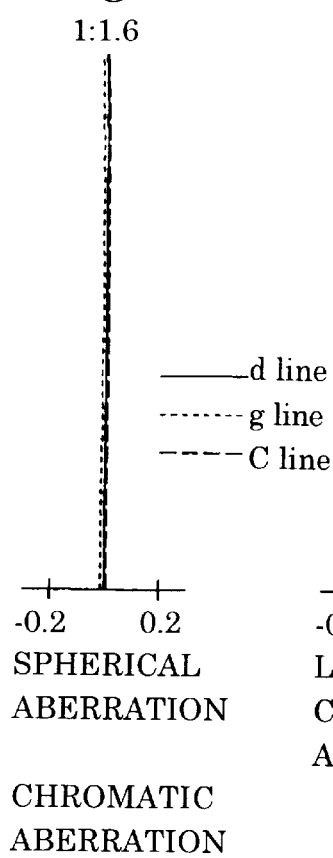
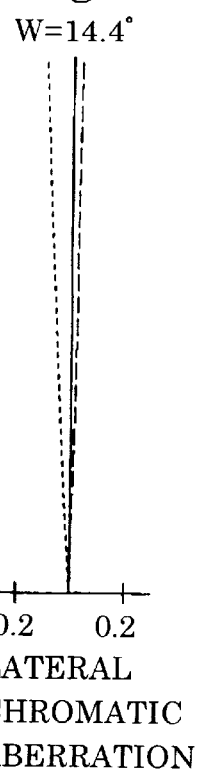
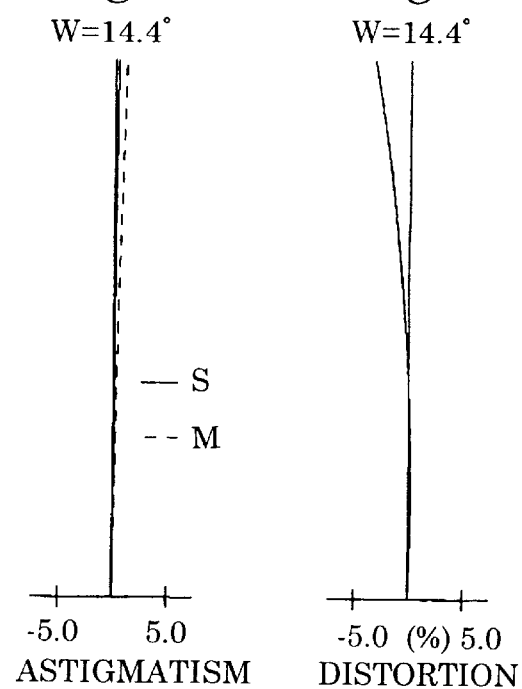
Fig.15A 1:1.6
Fig.15B W=14.4°
Fig.15C W=14.4°
Fig.15D W=14.4°
———— d line
-------- g line
———— C line
— S
-- M
-0.2  0.2
SPHERICAL ABERRATION
CHROMATIC ABERRATION
-0.2  0.2
LATERAL CHROMATIC ABERRATION
-5.0  5.0
ASTIGMATISM
-5.0  (%) 5.0
DISTORTION

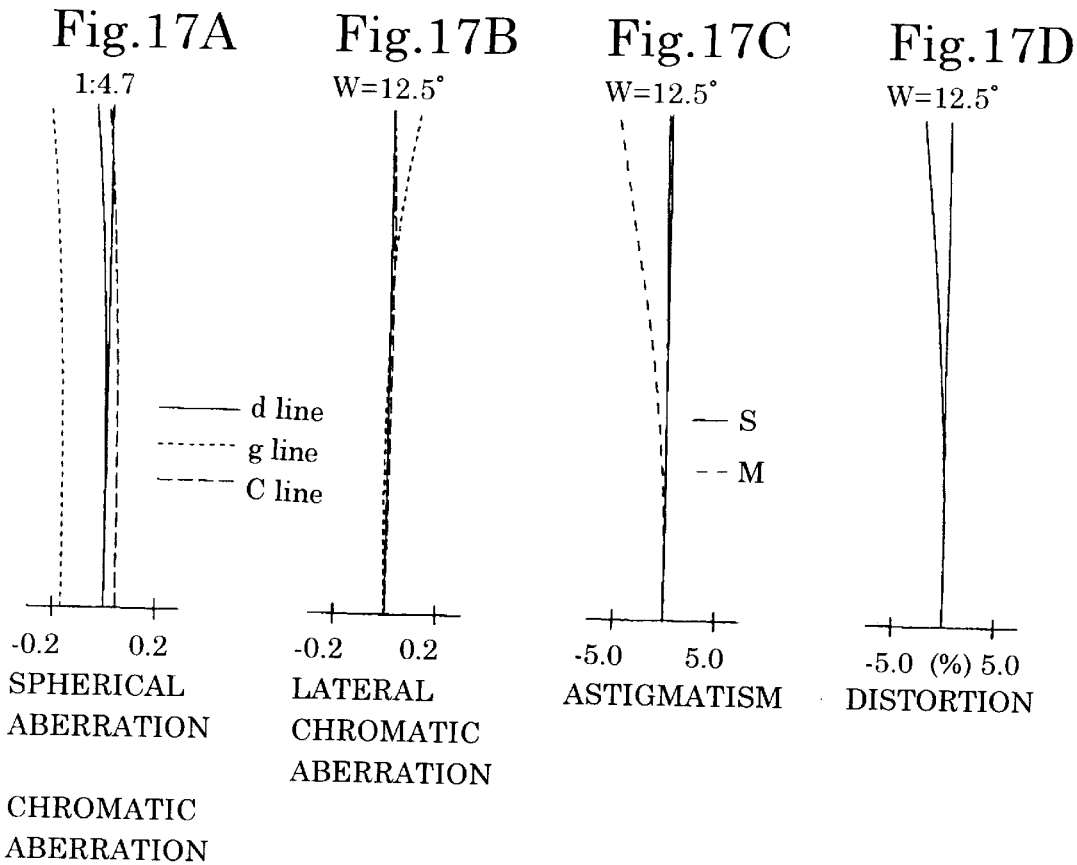
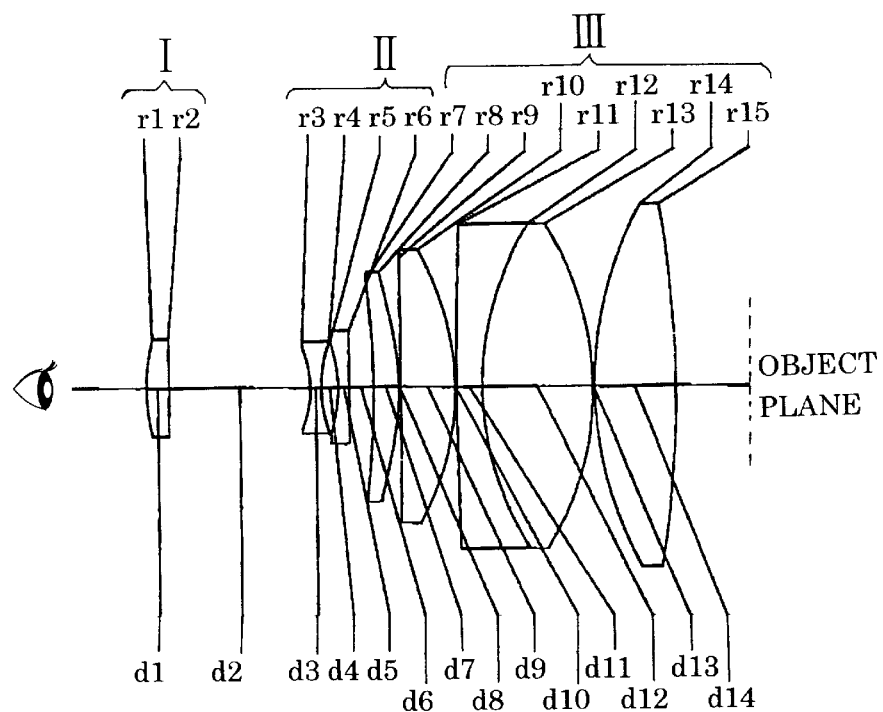

Fig.18A
1:1.8
Fig.18B
W=12.6°
Fig.18C
W=12.6°
Fig.18D
W=12.6°
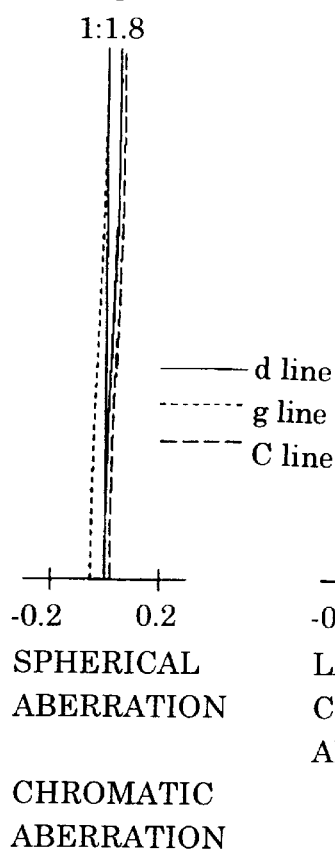
——— d line
········ g line
– – – C line
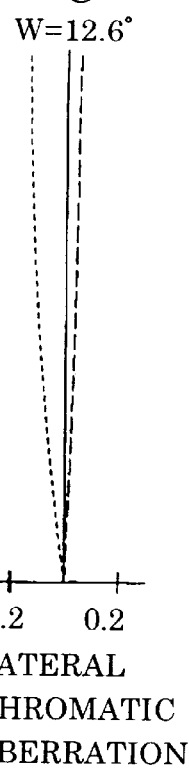
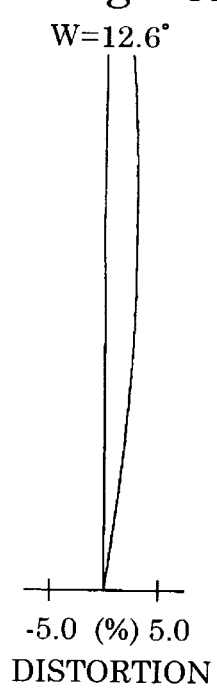
——— S
– – M
-0.2  0.2
SPHERICAL
ABERRATION
CHROMATIC
ABERRATION
-0.2  0.2
LATERAL
CHROMATIC
ABERRATION
-5.0  5.0
ASTIGMATISM
-5.0 (%) 5.0
DISTORTION

ZOOM MAGNIFIER

BACKGROUND OF THE INVENTION

1. Field of the Invention

The present invention relates to a zoom magnifier in which magnification can be varied upon necessity while the zoom magnifier is being used.

2. Description of the Related Art

As an example of the prior art, a zoom magnifier disclosed in Japanese Laid Open Publication No. 5-134193 has been known. However, in this prior art, the pupil diameter has inevitably become too small, which causes difficulties in securing an sufficient observing field of the zoom magnifier.

SUMMARY OF THE INVENTION

The object of the present invention is to provide a zoom magnifier which has a large pupil diameter which can secure a wider observing field while satisfactory optical performance is obtained.

In order to achieve the above mentioned object, there is provided a zoom magnifier composed of a positive first lens group, a negative second lens group, a positive third lens group, in this order from the eye side, wherein zooming is performed by moving the second lens group in the optical axis direction, and wherein the zoom magnifier satisfies the following condition:

$$30\text{mm} < f_I \quad (1)$$

wherein $f_I$ designates the focal length of the first lens group.

The zoom magnifier preferably satisfies the following conditions:

$$-0.35 < f_{II}/f_I < 0.2 \quad (2)$$

$$0.3 < L/f_I < 0.6 \quad (3)$$

wherein $f_{II}$ designates the focal length of the second lens group;

L designates the distance between the first lens group and the second lens group at the lowest magnification.

The third lens group preferably includes at least one aspherical lens element in which at least one aspheric surface is provided on either one or the other surface.

The aspheric surface is formed to satisfy the following requirements:

(a) If a paraxial spherical surface is made convex, power of the aspherical surface weakens in the peripheral area of the aspherical surface compared with the paraxial spherical surface;

(b) If a paraxial spherical surface is made concave, power of the aspherical surface strengthens in the peripheral area of the aspherical surface compared with the paraxial spherical surface.

Furthermore, the aspheric surface preferably satisfies the following condition:

$$0.5 \times 10^{-6} < \alpha A4_{III} < 0.1 \times 10^{-3} \quad (4)$$

wherein $\alpha$ designates a constant that is $-1$ when the aspheric surface is made on the surface on the eye side, and is $+1$ when the aspheric surface is on the object side; and $A4_{III}$ designates the largest absolute value of the fourth-order aspherical coefficient of an aspherical surface out of one or more aspherical surfaces in the third lens group.

The present disclosure relates to subject matter contained in Japanese Patent Application No. 9-300803 (filed on Oct. 31, 1997) which is expressly incorporated herein by reference in its entirety.

BRIEF DESCRIPTION OF THE DRAWINGS

The invention will be discussed below in detail with reference to the accompanying drawings, in which:

FIG. 1 is a lens arrangement of the first embodiment according to the present invention;

FIGS. 2A, 2B, 2C and 2D show aberration diagrams at the lowest magnification;

FIGS. 3A, 3B, 3C and 3D show aberration diagrams at the highest magnification;

FIG. 4 is a lens arrangement of the second embodiment according to the present invention;

FIGS. 5A, 5B, 5C and 5D show aberration diagrams at the lowest magnification;

FIGS. 9A, 9B, 9C and 9D show aberration diagrams at the highest magnification;

FIG. 10 is a lens arrangement of the fourth embodiment according to the present invention;

FIGS. 11A, 11B, 11C and 11D show aberration diagrams at the lowest magnification;

FIGS. 12A, 12B, 12C and 12D show aberration diagrams at the highest magnification;

FIG. 13 is a lens arrangement of the fifth embodiment according to the present invention;

FIGS. 14A, 14B, 14C and 14D show aberration diagrams at the lowest magnification;

FIGS. 15A, 15B, 15C and 15D show aberration diagrams at the highest magnification;

FIG. 16 is a lens arrangement of the sixth embodiment according to the present invention;

FIGS. 17A, 17B, 17C and 17D show aberration diagrams at the lowest magnification; and FIGS. 18A, 18B, 18C and 18D show aberration diagrams at the highest magnification.

DESCRIPTION OF THE PREFERRED EMBODIMENT

Figure 6A:
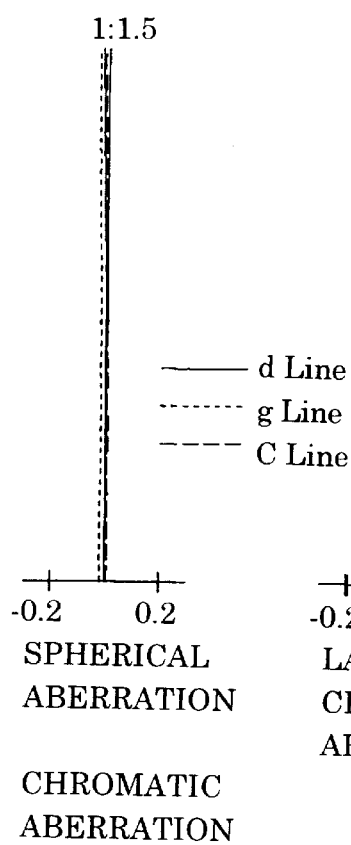
FIGS. 6A, 6B, 6C and 6D show aberration diagrams at the highest magnification.
Figure 6B:
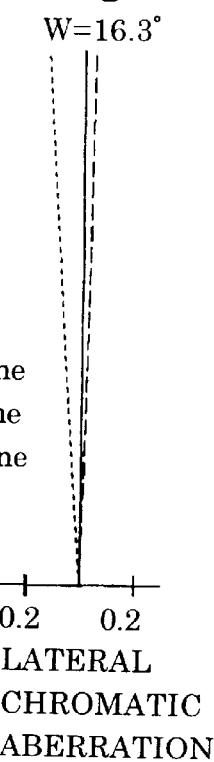
Figure 6C:
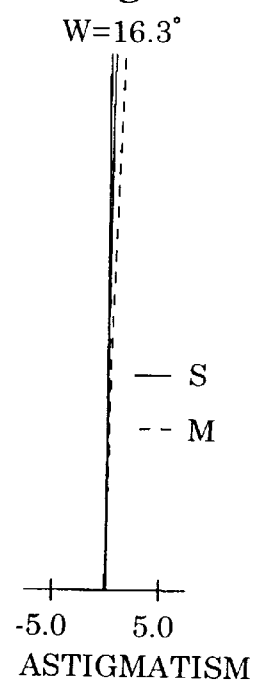
Figure 6D:
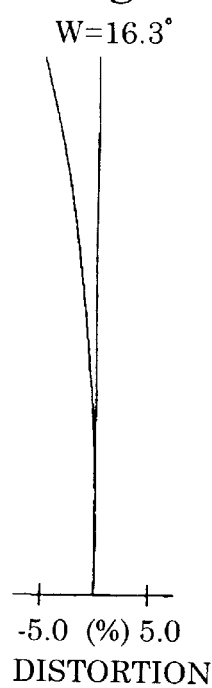

In an optical system such as a magnifier, when an observation is being made by an operator, the so-called blackout of vision occurs if the operator's pupil does not meet the pupil of the optical system. To reduce the (frequent) occurrence of the blackout, making the pupil diameter of an optical system larger is effective. Preferably, the pupil diameter of an optical system should be more than 10 mm.

According to the present invention, a zoom magnifier is composed of, in order from the eyepiece side, a positive first lens group I, a negative second lens group II, and a positive third lens group III, and the negative second lens group II is arranged to move along the optical axis when zooming is being performed. With this lens arrangement, a pupil diameter can be made larger when the focal length of the positive first lens group I is made longer, so that the operator can use the zoom magnifier with less possibility of blackout occurrence while satisfactory optical performance is secured.

Furthermore, in the zoom magnifier according to the present invention, since the images formed by the second lens group II and the third lens group III are viewed through the first lens group I, it is important to curb the occurrence of spherical aberration and coma in the first lens group I to a minimum. It has been understood that spherical aberration and coma are in proportion to an ratio φ/f defined by the focal length of a lens "f" and the effective diameter of a lens "φ." Accordingly, if the focal length of the first lens group is made relatively longer, spherical aberration and coma are sufficiently curbed, and satisfactory optical performance can be attained.

Condition (1) determines the focal length of the first lens group I so that a pupil diameter can be made larger and satisfactory optical performance can be attained.

If $f_I$ is lower than the lower limit, the pupil diameter during observation by an operator decreases, and an operator will have higher possibility of blackout occurrence.

In the zoom magnifier of the present invention, as explained, zooming is performed by the second lens group II. As the nature of a lens, the weaker the power of the second lens group becomes, the longer the second lens group II has to be moved to obtain the same target magnification ratio.

On the other hand, in order to reduce cost, if the first lens group I is composed of the positive single lens element, spherical aberration and coma occurred in the first lens group I have to be corrected by the diverging effect of the second lens group II. When a zooming operation is being performed, if a traveling distance of the second lens group II is longer, fluctuations in the correction amount of spherical and comas intensify; hence, satisfactory optical performance cannot be attained within the zooming range.

Condition (2) therefore determines the focal length of the second lens group II, that is, the focal length of the second lens group II can be appropriately made shorter, which means that appropriate power is given to the second lens group II.

If $f_{II}/f_I$ is lower than the lower limit, the traveling distance of the second lens group II becomes too long, and aberration fluctuations increase when a zooming operation is being performed.

If $f_{II}/f_I$ is higher than the upper limit, spherical and comas are over-corrected.

Condition (3) determines the distance between the second lens group II having an optimum power determined by condition (2) and the first lens group I (i.e.,the distance from the most object side surface of the first lens group I to the most eye side surface of the second lens group II).

If $L/f_I$ is lower than the lower limit, the diverging effect of the second lens group II becomes too strong, and accordingly, sufficient spherical and coma are over-corrected.

If $L/f_I$ is higher than the upper limit, the diverging effect of the second lens group II becomes insufficient, and correction is not satisfactorily made to spherical aberration and coma.

Furthermore, since peripheral rays are passing through a portion distant from the optical axis in the third lens group III, coma and distortion tend to occur in the third lens group III. In order to correct these coma and distortion, an aspherical surface is formed on at least one lens surface in the third lens group III. More concretely, the aspherical surface is arranged to have stronger negative power toward the peripheral area thereof, i.e, the radial direction from the optical axis toward the peripheral area. In other words, if a paraxial spherical surface is made convex, positive power of the aspherical surface weakens in the peripheral area of the aspherical surface compared with the paraxial spherical surface; and if a paraxial spherical surface is made concave, negative power of the aspherical surface strengthens in the peripheral area of the aspherical surface compared with the paraxial spherical surface.

Condition (4) determines the shape of the aspheric surface, for correcting coma and distortion, in the third lens group III.

If $\alpha A4_{III}$ is lower than the lower limit, the amount of asphericity on the aspheric surface becomes insufficient, and coma and distortion are not sufficiently corrected.

If $\alpha A4_{III}$ is higher than the upper limit, the amount of asphericity on the aspheric surface becomes excessive, and coma and distortion are over-corrected.

Specific numerical data of the embodiments will be described below with the tables and diagrams. $F_{NO}$ designates the F-number, f designates the focal length, M designates the magnification of the zoom magnifier, W designates the incident angle, $f_B$ designates the back focal distance. With respect to those numbers, the values at both the lowest magnification and the highest magnification (in this order) are indicated. The above "M" is calculated by the formula M=(250/f)+1. R designates the radius of curvature of each lens surface, D designates the thickness of a lens element or a distance between the lens elements, $N_d$ designates the refractive index at the d-line, υ represents the Abbe number at the d-line. The d, g and c lines designate chromatic aberration represented by spherical aberration and lateral chromatic aberration at the respective wave length. S designates the sagittal image, and M designates the meridional image. The aspherical surface is generally defined as follows:

$$x=ch^2/\{1+[1-(1+K)c^2h^2]^{1/2}\}+A4h^4+A6h^6+A8h^8...$$

wherein, h designates a distance from the optical axis;

x designates a distance from a tangent plane of an aspherical vertex;

c designates a curvature of the aspherical vertex (1/r);

K designates a conic constant;

A4 designates a fourth-order aspherical coefficient;

A6 designates a sixth-order aspherical coefficient;

A8 designates a eighth-order aspherical coefficient.

Embodiment 1

FIG. 1 is a lens arrangement of the first embodiment according to the present invention. FIGS. 2A, 2B, 2C and 2D show aberration diagrams at the lowest magnification, and FIGS. 3A, 3B, 3C and 3D show aberration diagrams at the highest magnification. Table 1 shows the numerical data. According to the lens arrangement in order from the eye side, a positive first lens group I composed of a positive single lens element, a negative second lens group II composed of two lens elements divided into two sub-lens groups, and a positive third lens group III composed of four lens elements divided into three sub-lens groups. The lens distances d2 and d6 are variable, and in Table 1 the values for those distances at both the lowest magnification and the highest magnification (in this order) are indicated.

TABLE 1

$F_{NO} = 3.0–1.4$
$M = 5.13–10.73$
$f = 60.57–25.69$
$W = 15.4°–16.3°$
$f_B = 37.25–33.50$

| Surface No. | R | D | $N_d$ | $\nu$ |
|---|---|---|---|---|
| 1 | 28.700 | 4.00 | 1.51633 | 64.1 |
| 2 | −176.080 | 20.90–9.50 | — | — |
| 3 | −17.279 | 1.50 | 1.74400 | 44.8 |
| 4 | 43.000 | 1.60 | — | — |
| 5* | −48.425 | 1.50 | 1.49176 | 57.4 |
| 6 | 143.440 | 2.37–13.76 | — | — |
| 7* | 133.832 | 10.00 | 1.49176 | 57.4 |
| 8* | −26.000 | 0.20 | — | — |
| 9 | 197.685 | 3.50 | 1.78472 | 25.7 |
| 10 | 45.000 | 12.90 | 1.62041 | 60.3 |
| 11 | −45.000 | 0.20 | — | — |
| 12 | 44.030 | 9.50 | 1.51633 | 64.1 |
| 13 | −712.969 | — | — | — |

*indicates the aspherical surface which is symmetrical with respect to the optical axis.
The aspherical data (aspherical coefficients which are not indicated are zero):
No. 5: $K = 0.00$, $A4 = 0.66300 \times 10^{-4}$
No. 7: $K = 0.00$, $A4 = -0.63200 \times 10^{-5}$
No. 8: $K = 0.00$, $A4 = 0.54500 \times 10^{-5}$, $A6 = 0.36800 \times 10^{-8}$

Embodiment 2

FIG. 4 is a lens arrangement of the second embodiment according to the present invention. FIGS. 5A, 5B, 5C and 5D show aberration diagrams at the lowest magnification. FIGS. 6A, 6B, 6C and 6D show aberration diagrams at the highest magnification. Table 2 shows the numerical data. The basic lens structure is the same as that of the first embodiment. The lens distances d2 and d6 are variable, and in Table 2 the values for those distances at both the lowest magnification and the highest magnification (in this order) are indicated.

TABLE 2

$F_{NO} = 3.0–1.5$
$M = 5.13–10.73$
$f = 60.60–25.70$
$W = 14.2°–16.3°$
$f_B = 36.64–34.08$

| Surface No. | R | D | $N_d$ | $\nu$ |
|---|---|---|---|---|
| 1 | 34.770 | 4.00 | 1.60311 | 60.7 |
| 2 | −1313.550 | 20.70–5.57 | — | — |
| 3 | −50.204 | 1.50 | 1.74400 | 44.8 |
| 4 | 42.615 | 3.39 | — | — |
| 5 | −26.724 | 1.50 | 1.65844 | 50.9 |
| 6 | −323.650 | 2.00–17.13 | — | — |
| 7* | 65.354 | 9.00 | 1.49176 | 57.4 |
| 8* | −41.905 | 0.20 | — | — |
| 9 | 300.080 | 3.50 | 1.78472 | 25.7 |
| 10 | 45.000 | 12.90 | 1.62041 | 60.3 |
| 11 | −45.000 | 0.20 | — | — |
| 12 | 40.000 | 8.80 | 1.51633 | 64.1 |
| 13 | ∞ | — | — | — |

*indicates the aspherical surface which is symmetrical with respect to the optical axis.
The aspherical data (aspherical coefficients which are not indicated are zero):
No. 7: $K = 0.00$, $A4 = -0.32000 \times 10^{-5}$
No. 8: $K = 0.00$, $A4 = -0.56600 \times 10^{-5}$

Embodiment 3

Figure 7:
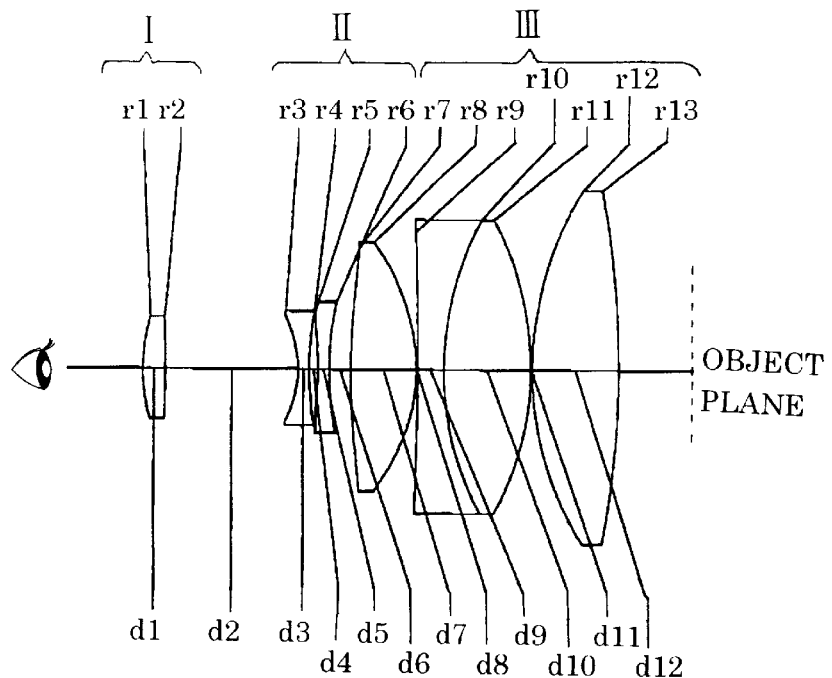
FIG. 7 is a lens arrangement of the third embodiment according to the present invention.
Figures 8A, 8B, 8C, 8D:
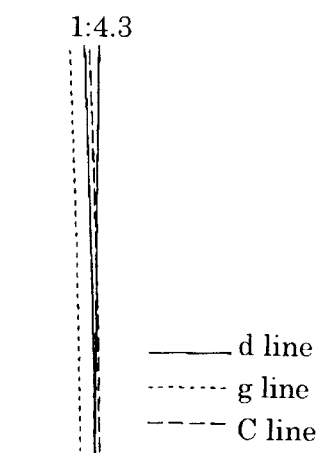
FIGS. 8A, 8B, 8C and 8D show aberration diagrams at the lowest magnification.

FIG. 7 is a lens arrangement of the third embodiment according to the present invention. FIGS. 8A, 8B, 8C and 8D show aberration diagrams at the lowest magnification. FIGS. 9A, 9B, 9C and 9D show aberration diagrams at the highest magnification. Table 3 shows the numerical data. The basic lens structure is the same as that of the first embodiment. The lens distances d2 and d6 are variable, and in Table 3 the values for those distances at both the lowest magnification and the highest magnification (in this order) are indicated.

TABLE 3

$F_{NO} = 4.3–1.8$
$M = 5.12–10.72$
$f = 60.61–25.71$
$W = 15.5°–15.5°$
$f_B = 40.25–37.19$

| Surface No. | R | D | $N_d$ | $\nu$ |
|---|---|---|---|---|
| 1 | 26.752 | 3.00 | 1.60311 | 60.7 |
| 2 | −206.142 | 17.62–8.15 | — | — |
| 3 | −16.500 | 1.50 | 1.80400 | 46.6 |
| 4 | 46.419 | 1.18 | — | — |
| 5* | −45.000 | 1.50 | 1.49176 | 57.4 |
| 6 | 43.832 | 2.92–12.39 | — | — |
| 7* | 85.928 | 8.80 | 1.49176 | 57.4 |
| 8* | −27.247 | 0.20 | — | — |
| 9 | −508.760 | 3.50 | 1.80518 | 25.4 |
| 10 | 45.000 | 11.60 | 1.65160 | 58.5 |
| 11 | −45.000 | 0.20 | — | — |
| 12 | 49.069 | 11.50 | 1.65160 | 58.5 |
| 13 | −135.620 | — | — | — |

*indicates the aspherical surface which is symmetrical with respect to the optical axis.
The aspherical data (aspherical coefficients which are not indicated are zero):
No. 5: $K = 0.00$, $A4 = 0.98350 \times 10^{-4}$
No. 7: $K = 0.00$, $A4 = -0.81680 \times 10^{-5}$, $A6 = 0.24540 \times 10^{-8}$
No. 8: $K = 0.00$, $A4 = 0.48220 \times 10^{-5}$, $A6 = 087470 \times 10^{-9}$

Embodiment 4

FIG. 10 is a lens arrangement of the fourth embodiment according to the present invention. FIGS. 11A, 11B, 11C and 11D show aberration diagrams at the lowest magnification. FIGS. 12A, 12B, 12C and 12D show aberration diagrams at the highest magnification. Table 4 shows the numerical data. The basic lens structure is the same as that of the first embodiment except that the third lens group III is composed five lens elements divided into four sub-lens groups. The lens distances d2 and d6 are variable, and in Table 4 the values for those distances at both the lowest magnification and the highest magnification (in this order) are indicated.

TABLE 4

$F_{NO} = 3.0–1.4$
$M = 5.12–10.73$
$f = 60.69–25.69$
$W = 14.1°–15.4°$
$f_B = 35.61–32.97$

| Surface No. | R | D | $N_d$ | $\nu$ |
|---|---|---|---|---|
| 1 | 43.450 | 3.50 | 1.51633 | 64.1 |
| 2 | −65.106 | 22.87–10.09 | — | — |
| 3 | −16.500 | 1.50 | 1.74400 | 44.8 |
| 4 | 84.318 | 0.90 | — | — |
| 5* | −65.806 | 1.50 | 1.49176 | 57.4 |
| 6 | 90.000 | 2.56–15.34 | — | — |
| 7 | ∞ | 4.00 | 1.49176 | 57.4 |
| 8* | −48.357 | 0.10 | — | — |
| 9 | 216.203 | 8.00 | 1.51633 | 64.1 |
| 10 | −42.600 | 0.10 | — | — |
| 11 | 197.685 | 3.50 | 1.78472 | 25.7 |
| 12 | 45.000 | 12.90 | 1.62041 | 60.3 |

TABLE 4-continued

| 13 | −45.000 | 0.1 | — | — |
| 14 | 45.00 | 6.50 | 1.51633 | 64.1 |
| 15 | 360.000 | — | — | — |

*indicates the aspherical surface which is symmetrical with respect to the optical axis.
The aspherical data (aspherical coefficients which are not indicated are zero):
No. 5: K = 0.00, A4 = 0.43770 × $10^{-4}$, A6 = 0.21500 × $10^{-7}$
No. 8: K = 0.00, A4 = 0.98870 × $10^{-5}$, A6 = 0.48300 × $10^{-8}$ Embodiment 5

FIG. 13 is a lens arrangement of the fifth embodiment according to the present invention. FIGS. 14A, 14B, 14C and 14D show aberration diagrams at the lowest magnification. FIGS. 15A, 15B, 15C and 15D show aberration diagrams at the highest magnification. Table 5 shows the numerical data. The basic lens structure is the same as that of the fourth embodiment. The lens distances d2 and d6 are variable, and in Table 5 the values for those distances at both the lowest magnification and the highest magnification (in this order) are indicated.

$F_{NO}$ = 3.8–1.6
M = 5.13–10.73
f = 60.60–25.70
W = 14.0°–14.4°
$f_B$ = 35.92–33.54

| Surface No. | R | D | $N_d$ | ν |
|---|---|---|---|---|
| 1 | 35.662 | 3.70 | 1.60311 | 60.7 |
| 2 | 379.400 | 22.76–4.72 | — | — |
| 3 | −238.662 | 1.50 | 1.80400 | 46.6 |
| 4 | 35.885 | 3.72 | — | — |
| 5* | −23.956 | 1.50 | 1.49176 | 57.4 |
| 6 | ∞ | 2.00–20.04 | — | — |
| 7 | 132.519 | 3.50 | 1.49176 | 57.4 |
| 8* | −92.684 | 0.20 | — | — |
| 9 | 96.933 | 7.00 | 1.65160 | 58.5 |
| 10 | −80.683 | 0.20 | — | — |
| 11 | 524.140 | 3.50 | 1.80518 | 25.4 |
| 12 | 46.070 | 11.00 | 1.65160 | 58.5 |
| 13 | −53.018 | 0.20 | — | — |
| 14 | 102.350 | 6.00 | 1.48749 | 70.2 |
| 15 | −87.100 | — | — | — |

*indicates the aspherical surface which is symmetrical with respect to the optical axis.
The aspherical data (aspherical coefficients which are not indicated are zero):
No. 5: K = 0.00, A4 = −0.26950 × $10^{-5}$
No. 8: K = 0.00, A4 = 0.10850 × $10^{-4}$ Embodiment 6

FIG. 16 is a lens arrangement of the sixth embodiment of the zoom magnifier according to the present invention. FIGS. 17A, 17B, 17C and 17D show aberration diagrams at the lowest magnification. FIGS. 18A, 18B, 18C and 18D show aberration diagrams at the highest magnification. Table 6 shows numerical data. The basic lens structure is the same as that of the fourth embodiment. The lens distances d2 and d6 are variable, and in Table 6 the values for those distances at both the lowest magnification and the highest magnification (in this order) are indicated.

TABLE 6

$F_{NO}$ = 4.7–1.8
M = 4.82–10.73
f = 65.52–25.70
W = 12.5°–12.6°
$f_B$ = 41.35–38.68

| Surface No. | R | D | $N_d$ | ν |
|---|---|---|---|---|
| 1 | 30.897 | 3.00 | 1.77250 | 49.6 |
| 2 | −329.080 | 19.29–10.96 | — | — |
| 3 | −16.500 | 1.50 | 1.74400 | 44.8 |
| 4 | 21.086 | 2.33 | — | — |
| 5* | −16.841 | 1.50 | 1.49176 | 57.4 |
| 6 | −1631.000 | 3.35–11.68 | — | — |
| 7 | −127.481 | 3.50 | 1.49176 | 57.4 |
| 8* | −37.552 | 0.20 | — | — |
| 9 | −3228.000 | 7.50 | 1.60311 | 60.7 |
| 10 | −40.000 | 0.20 | — | — |
| 11 | 619.800 | 3.50 | 1.80518 | 25.4 |
| 12 | 45.000 | 15.00 | 1.65160 | 58.5 |
| 13 | −45.000 | 0.20 | — | — |
| 14 | 55.488 | 11.00 | 1.65160 | 58.5 |
| 15 | −157.325 | — | — | — |

*indicates the aspherical surface which is symmetrical with respect to the optical axis.
The aspherical data (aspherical coefficients which are not indicated are zero):
No. 5: K = 0.00, A4 = 0.98900 × $10^{-4}$, A6 = 0.16670 × $10^{-5}$
No. 8: K = 0.00, A4 = 0.15640 × $10^{-4}$ Table 7 shows the numerical data for each condition for the first through sixth embodiments:

TABLE 7

| | Condition (1) | Condition (2) | Condition (3) |
|---|---|---|---|
| Emb. 1 | 48.11 | −0.271 | 0.434 |
| Emb. 2 | 56.23 | −0.308 | 0.368 |
| Emb. 3 | 39.45 | −0.274 | 0.447 |
| Emb. 4 | 51.03 | −0.285 | 0.448 |
| Emb. 5 | 65.00 | −0.318 | 0.350 |
| Emb. 6 | 36.70 | −0.232 | 0.526 |

As can be clearly seen from Table 7, all the embodiments (1 through 6) satisfy conditions (1) through (3). The aberrations shown the aberration diagrams are satisfactorily corrected.

According to the present invention, a zoom magnifier can have a large pupil diameter which can secure a wider observing field with less possibility of blackout occurrence while satisfactory optical performance is obtained.

What is claimed is:

1. A zoom magnifier consisting of a positive first lens group, a negative second lens group and a positive third lens group, in this order from the eye side, wherein zooming is performed by moving said second lens group in the optical axis direction;

wherein said third lens group has at least one aspherical lens element in which at least one aspheric surface is provided on either surface, and said aspheric surface satisfies the following:

(a) if a paraxial spherical surface is convex, a power of said aspherical surface weakens in a peripheral area of said aspherical surface compared with said paraxial spherical surface; and (b) if a paraxial spherical surface is concave, a power of said aspherical surface strengthens in a peripheral area of said aspherical surface compared with said paraxial spherical surface;

wherein the magnifier is an observation optical system; and wherein said zoom magnifier satisfies the following conditions:

$$30 \text{ mm} < f_I$$

$$-0.35 < f_{II}/f_I < -0.2 \text{ and}$$

$$0.3 < L/f_I < 0.6$$

wherein
- $f_I$ designates the focal length of said first lens group;
- $f_{II}$ designates the focal length of said second lens group; and
- L designates the distance between said first lens group and said second lens group at the lowest magnification.

2. The zoom magnifier according to claim 1, wherein said aspheric surface satisfies the following condition:

$$0.5 \times 10^{-6} < \alpha A4_{III} < 0.1 \times 10^{-3}$$

wherein
- α designates a constant which is −1 when said aspheric surface is made on the surface on the eye side, and is +1 when said aspheric surface is on the object side; and
- $A4_{III}$ designates the largest absolute value of the fourth-order aspherical coefficient of an aspherical surface out of one or more aspherical surfaces in the third lens group.

* * * * *